United States Patent [19]
Babbitt, III

[11] Patent Number: 6,010,421
[45] Date of Patent: Jan. 4, 2000

[54] CHAIN MASTER LINK

[75] Inventor: Edwin V. Babbitt, III, Marion, Mass.

[73] Assignee: Babbitt Steam Specialty Company, New Bedford, Mass.

[21] Appl. No.: 09/153,597

[22] Filed: Sep. 15, 1998

[51] Int. Cl.[7] .............. F16G 13/10; F16G 13/06
[52] U.S. Cl. .............. 474/210; 474/214; 59/86; 59/93
[58] Field of Search .............. 59/93, 84, 35.1, 59/78.1, 6, 4; 474/207, 210–218, 224–226

[56] References Cited

U.S. PATENT DOCUMENTS

| | | | |
|---|---|---|---|
| 1,027,352 | 5/1912 | Morse | 474/215 |
| 3,009,500 | 11/1961 | Russell | 59/93 |
| 3,334,726 | 8/1967 | Fredrikson | 474/210 X |
| 3,817,028 | 6/1974 | Blackwood . | |
| 3,962,811 | 6/1976 | Buschini et al. . | |
| 4,095,416 | 6/1978 | Issard . | |
| 4,459,124 | 7/1984 | Newton | 474/210 |
| 5,628,178 | 5/1997 | Beckham | 59/93 |
| 5,682,736 | 11/1997 | Chia et al. | 59/35.1 |
| 5,692,985 | 12/1997 | Hirata et al. | 474/210 |

Primary Examiner—Tamara L. Graysay
Assistant Examiner—Marcus Charles
Attorney, Agent, or Firm—David S. Resnick; Nixon Peabody LLP

[57] ABSTRACT

A master link for a standard chainwheel chain, having a substantially planar shackle body having a bore located thereon and first and second extensions extending from the shackle body and terminating at respective ends thereof. The extension have longitudinal axes and are twisted about 90° along their longitudinal axes. The respective ends of the extensions have bores therethrough. A tab member is positioned parallel to the shackle body and has a bore therein in substantial alignment with the bore in said shackle body. A 180° bent portion connecting said shackle body and said tab member. A first pin connects said bores in the extensions and a second pin connects the bores in the shackle body and the tab member.

5 Claims, 2 Drawing Sheets

CHAIN MASTER LINK

BACKGROUND OF THE INVENTION

1. Field of the Invention

The present invention relates to the linking of chains generally, and more specifically to a master link for chains used with chainwheel operators.

2. Background

Chainwheel operators are known in the art. FIG. 1 depicts a schematic view of such an operator. A chainwheel 20 is attached to the handwheel of a valve, and can be accordingly likewise rotated as depicted by arrow A. A guide member 25 attaches in pivoting, hanging fashion from the center of the chainwheel, and provides two arms with chain guides at the end thereof. The chain 30 passes through the chainguides of the guide member 25 and around the chainwheel. Pulling on the chainwheel turns the chainwheel 20, and therefore the valve hand wheel to which it is attached.

Replacing the chains on a chainwheel can be cumbersome and time consuming. Usually, this will entail crimping or wrapping the end of an open link about the loop of an opposite end link using vises and locking pliers. This process cannot be easily accomplished in the field. Because of the mechanical deformation of the adjoining links where the chain ends are joined, the joint becomes quite literally the weakest link in the chain.

At least one master link has been proposed for chainwheel chains in U.S. Pat. No. 5,628,178. FIG. 2 depicts the '128 master link 40 attaching opposite ends of chain 30 riding in the channel of the chainwheel 20. FIG. 3 depicts in exploded view the prior art master link 40. A shackle body 42 is configured to receive a pressing member 44 and a bolt 46 which threadedly engages threaded bore 47. The shackle member extends to form two extensions 48 and 50 which terminate in loops. Pin 52 passes through bore 54 and thereafter threadedly engages threaded bore 56. When attached to chain ends as depicted in FIG. 2, pin 52 engages one end of the chain, and the bent tab 58 of the pressing member 44 engages the other against the shackle body 42.

The prior art master link, however, is expensive to manufacture. The design calls for a two-piece body comprising a shackle body and a press member. Further, the prior art master link is designed to be easily removable from the chain, thus the design includes expensive parts and requires assembly tolerances that may in practice not be required for most uses. However, oftentimes a master link does not need to be removed after it is attached. Further, the press member tab 58, because of its bent design, concentrates stresses at the bend, which could lead to breakage. To avoid breakage, more expensive materials are required for heavy-duty performance. Further, the very removable nature of the pressing member bolt 46 of the '128 master link as well as the pin 52 may lead to loosening and eventual disassociation of the pin 52 and bolt 46 from the shackle, leading to the separation of the chain ends. Such separation could lead to injury of the operator.

SUMMARY OF THE INVENTION

It is an object of this invention to provide a low-cost, high-strength alternative to the removable prior art master link. The present invention provides a permanently attached chain master link for chainwheel chains at lower overall cost and increased strength which is easily attached in the field.

According to the invention a master link for a standard chainwheel chain is provided, having a substantially planar shackle body having a bore located thereon and first and second extensions extending from the shackle body and terminating at respective ends thereof. The extensions have longitudinal axes and are twisted about 90° along their longitudinal axes. The respective ends of the extensions have bores therethrough. A tab member is positioned parallel to the shackle body and has a bore therein in substantial alignment with the bore in said shackle body. A 180° bent portion connecting said shackle body and said tab member. A first pin connects said bores in the extensions and a second pin connects the bores in the shackle body and the tab member.

Features of the invention include a one piece body, lending additional strength and allowing the use of less expensive materials at less exacting tolerances. The body is configured to require very little machining and can be inexpensively fabricated in less time than the prior art link. The body is advantageously stamped and mechanically deformed from a single piece of metal, and requires no threads. The master link of the present invention is therefore manufacturable at a fraction of the cost of the prior art master link.

Other objects and advantages shall become apparent in the description of the invention which follows.

BRIEF DESCRIPTION OF THE DRAWINGS

The foregoing and other features and advantages of the present invention will be more fully understood from the following detailed description of an illustrative embodiment, taken in conjunction with the accompanying drawing in which.

DETAILED DESCRIPTION OF AN ILLUSTRATIVE EMBODIMENT

The present invention will be described herein with reference to an illustrative embodiment of a chainwheel master link.

Figure 3:
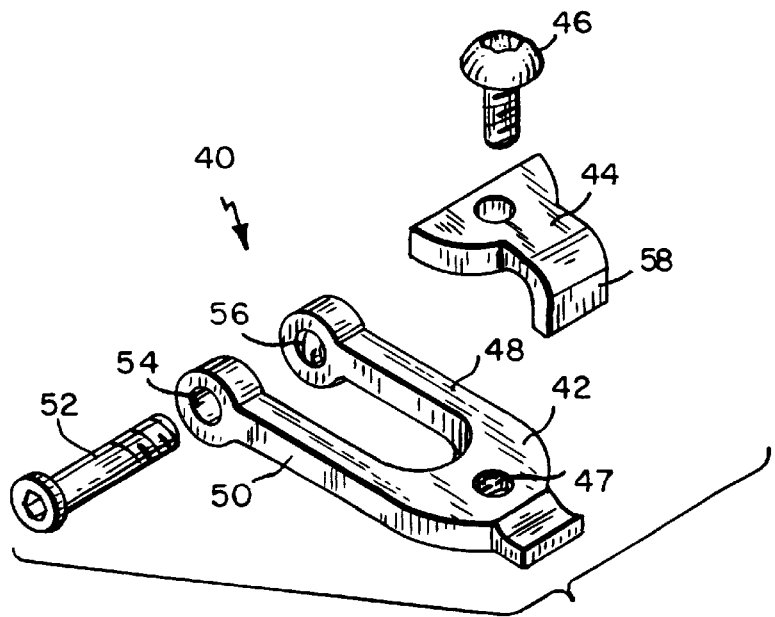
FIG. 3 depicts in exploded view the chain master link according to the prior art.
Figure 1:
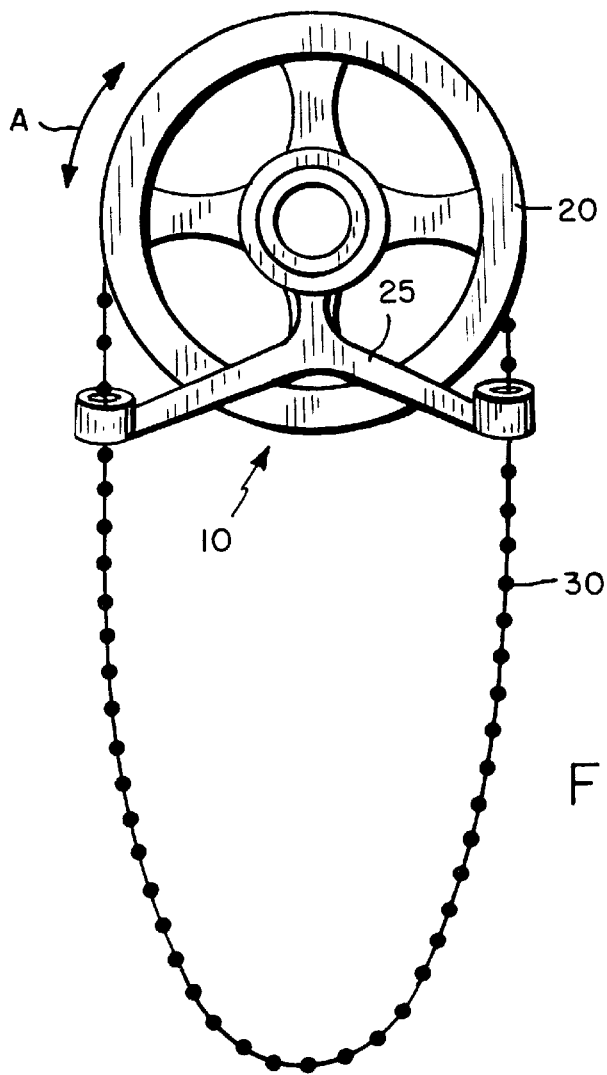
FIG. 1 depicts in schematic view a chainwheel operator according to the prior art.
Figure 2:
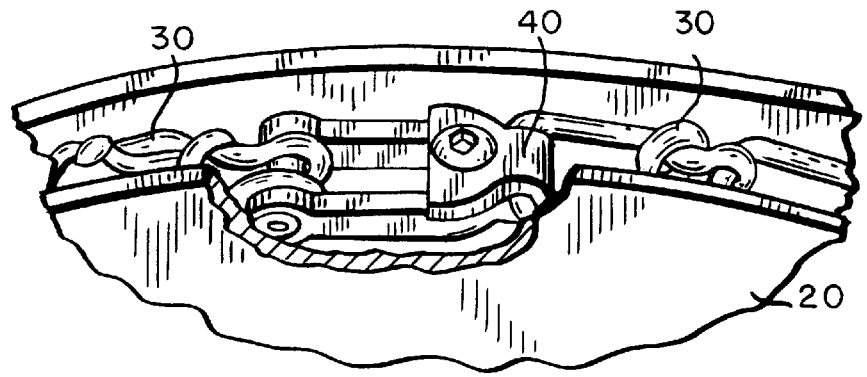
FIG. 2 depicts in isometric view the chain master link according to the prior art.
Figure 4:
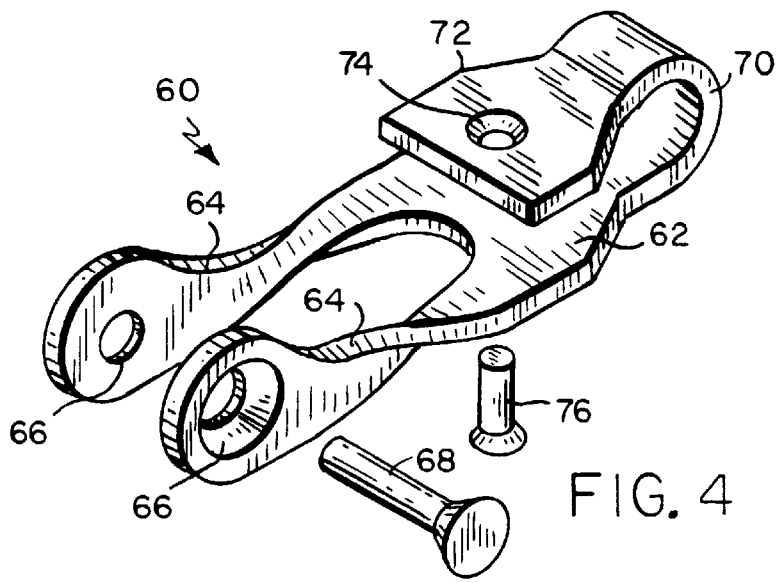
FIG. 4 depicts in exploded view the master link according to an illustrative embodiment of the present invention.

Turning to FIG. 4, an illustrative embodiment of the invention is depicted. The master link 60 is formed of essentially a unitary shackle 62, which is preferably made of stamped sheet steel and thereafter formed into substantially the shape as described herein. The extensions 64 are formed with bores 66 at the ends thereof, with the plan area of the extensions becoming larger at the ends thereof to accommodate the holes without sacrificing strength. The extensions 64 are twisted 90° along the axial direction so the the bores 66 will accept a pin 68 in a plane parallel to the major surface of the shackle body 62. The bores 66 accept pin 68, which is essentially a long solid rivet which is attached to the shackle body 62 via an appropriate plier or other setting tool. Shackle body 62 is bent at 70 to form a curve having a radius slightly bigger than the stock forming the chain links that the master link will secure. The bend 70 is about 180° such that the tab 72 has a major area in a plane parallel to that of the shackle body 62. Hole 74 is formed in the tab 72 which overlies a coaxial hole (not shown) in the shackle body 62. A pin 76 which is essentially a solid rivet which is attached to the shackle body 62 via an appropriate plier or other setting tool is accepted in the holes in essentially the same manner as pin 68.

Figure 5:
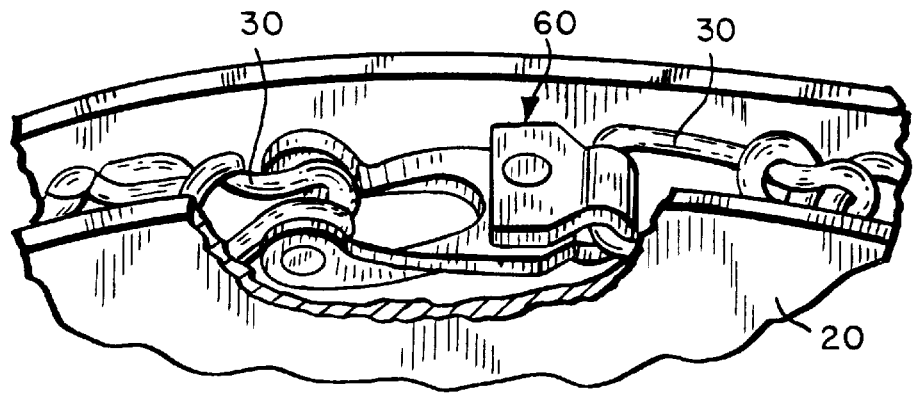
FIG. 5 depicts in isometric view the chain master link according an illustrative embodiment of the present invention

The opposite ends of chain 30 are attached to the master link 60 as shown in FIG. 5. The pin 68 is passed through one link as depicted and permanently set. The opposite link of chain 30 is received within the curve of bend 70 as depicted, and pin 76 is permanently set. Accordingly, the chain is permanently joined, and cannot be separated unless one of the pins 76 or 68 are mechanically forcefully removed.

While the illustrative embodiment has been described as using pins set by a plier, the pins could also be threaded into the shackle, or otherwise secured for example by kotter pins and the like should the shackle be desired to be removed. Further, while the illustrative embodiment is descriped as being fashioned from stamped steel, the shackle body could alternatively be formed by other processes well known to those having skill in the art. Although the invention has been shown and described with respect to exemplary embodiments thereof, various other changes, additions and omissions in the form and detail thereof may be made therein without departing from the spirit and scope of the invention.

What is claimed is:

1. A master link for a standard chainwheel chain, comprising:

a substantially planar shackle body having a bore located thereon;

first and second extensions extending from said shackle body, said extensions having longitudinal axes and said extensions being twisted about 90° along their longitudinal axes, said first and second extensions having bores;

a tab member positioned parallel to said shackle body and having a bore therein in substantial alignment with said bore in said shackle body;

a 180° bent portion connecting said shackle body and said tab member;

a first pin connecting said bores in said first and second extensions;

a second pin connecting said bores in said shackle body and said tab member, wherein said shackle body, said first and second extensions, said tab member and said bent portion are a unitary piece.

2. The master link of claim 1, wherein said first pin is a solid rivet.

3. The master link of claim 1, wherein said second pin is a solid rivet.

4. The master link of claim 2, wherein said second pin is a solid rivet.

5. A master link for a standard chainwheel chain, consisting essentially of:

a substantially planar shackle body having a bore located thereon;

first and second extensions extending from said shackle body, said extensions having longitudinal axes and said extensions being twisted about 90° along their longitudinal axes, said extensions having bores;

a planar tab member positioned parallel to said shackle body and having a bore therein in substantial alignment with said bore in said shackle body;

a 180° bent portion connecting said shackle body and said tab member;

a first pin connecting said bores in said first and second extensions;

a second pin connecting said bores in said shackle body and said tab member, wherein said shackle body, said first and second extensions, said tab member and said bent portion are a unitary piece.

* * * * *